(12) United States Patent
Harter

(10) Patent No.: US 6,375,200 B1
(45) Date of Patent: Apr. 23, 2002

(54) WHEELED CARRIER AND SEAT ASSEMBLY FOR USE WHILE HUNTING WITH DECOYS

(75) Inventor: Douglas S. Harter, Great Bend, KS (US)

(73) Assignee: Marshland Enterprises, LLC, Great Bend, KS (US)

(*) Notice: Subject to any disclaimer, the term of this patent is extended or adjusted under 35 U.S.C. 154(b) by 0 days.

(21) Appl. No.: 09/569,346

(22) Filed: May 11, 2000

(51) Int. Cl.⁷ .................................................. B62B 1/04

(52) U.S. Cl. ..................... 280/30; 280/652; 280/47.18; 280/47.29; 297/16.2; 297/129

(58) Field of Search ................................ 297/118, 129, 297/16.2; 280/30, 47.18, 47.25, 652, 47.29, 654, 655, 47.24, 47.27

(56) References Cited

U.S. PATENT DOCUMENTS

| | | | |
|---|---|---|---|
| 314,185 A | | 3/1885 | Knowlton |
| 2,328,047 A | * | 8/1943 | Anderson et al. ............ 297/118 |
| 2,394,245 A | * | 2/1946 | Koller ......................... 297/118 |
| 2,611,417 A | * | 9/1952 | Henry et al. ................... 280/30 |
| 3,041,084 A | | 6/1962 | Stehman et al. |
| 3,073,614 A | * | 1/1963 | Zinneman ..................... 280/30 |
| 3,104,890 A | | 9/1963 | Hill |
| 3,804,432 A | | 4/1974 | Lehrman |
| 3,865,392 A | | 2/1975 | Hartway |
| 3,997,213 A | | 12/1976 | Smith et al. |
| 4,235,449 A | * | 11/1980 | Tarran .......................... 280/30 |
| 4,376,547 A | * | 3/1983 | Dominko ....................... 280/30 |
| 4,582,165 A | * | 4/1986 | Latini ........................... 280/30 |
| 4,593,841 A | * | 6/1986 | Lange ...................... 280/47.25 |
| 4,659,142 A | | 4/1987 | Kuchinsky |
| 4,815,761 A | | 3/1989 | Henderson et al. |
| 4,846,486 A | | 7/1989 | Hobson |
| 5,056,804 A | * | 10/1991 | Wilson et al. ................. 280/30 |
| 5,062,650 A | * | 11/1991 | Chang ......................... 280/380 |
| 5,201,536 A | * | 4/1993 | Bono et al. .................... 280/30 |
| 5,265,892 A | | 11/1993 | Said |
| 5,330,212 A | | 7/1994 | Gardner |
| 5,356,197 A | * | 10/1994 | Simic ....................... 280/47.18 |
| 5,476,282 A | | 12/1995 | Dahl |
| 5,542,740 A | * | 8/1996 | Chang ..................... 280/47.18 |
| 5,903,997 A | | 5/1999 | Jacob |
| 6,196,560 B1 | * | 3/2001 | Ohlsson ....................... 280/30 |

* cited by examiner

Primary Examiner—Michael Mar
(74) Attorney, Agent, or Firm—Jeffrey L. Thompson; Thompson & Thompson P.A.

(57) ABSTRACT

A wheeled carrier for hunting is provided which provides a cart for transporting a bag full of decoys and can be converted into a bench seat or a reclined seat for the hunter after reaching his hunting blind. The carrier has three planar frame structures connected to each other. The frame structures are adjustable relative to each other to a first angular position in which the carrier has a generally L-shaped transport configuration, a second angular position in which the carrier has a generally inverted U-shaped bench seat configuration, a third angular position in which the carrier has a reclined seat configuration, and a fourth angular position in which the carrier has a compact storage configuration. A pair of removable wheel assemblies are connected to the middle frame structure for supporting the carrier in its L-shaped transport configuration. A plurality of straps and buckles are connected to the frame structures and the decoy bag for attaching the decoy bag to the carrier. The straps and buckles are also used to stabilize the frame structures when the carrier is in its bench seat configuration. The frame structures are formed of tubular frames covered by a fabric material stretched over the frames. The fabric material provides support surfaces for the decoy bag when the carrier is in its L-shaped transport configuration, and a comfortable seating surface for the hunter when the carrier is in its seat configurations. The fabric material can be interchanged with another fabric material having a different camouflage pattern.

17 Claims, 7 Drawing Sheets

WHEELED CARRIER AND SEAT ASSEMBLY FOR USE WHILE HUNTING WITH DECOYS

BACKGROUND OF THE INVENTION

1. Field of the Invention

The present invention relates generally to devices for carrying sporting equipment and devices that can be used for seating. In particular, the present invention relates to a wheeled carrier, which is particularly suitable for carrying a bag of hunting decoys, and which can be converted into a bench seat or a reclined seat configuration.

2. Description of the Related Art

Duck and goose hunting typically involves the use of numerous decoys that are spread out in a field or on open water by the hunter to attract the overflying ducks and geese. The decoys are often carried to the hunting site in large nylon mesh bags equipped with a drawstring for closing the bag and shoulder straps to facilitate carrying the bag. When these conventional decoy bags are fully loaded, they become quite heavy and difficult for a hunter to carry to the hunting site, particularly when a remote area is to be hunted that requires a substantial travel distance from the hunter's vehicle.

Game carrying carts for transporting either the game or the equipment, such as decoys, are known in the art. For example, U.S. Pat. No. 5,903,997 issued to James Jacob, discloses a hunting decoy blind and cart assembly that provides both a goose blind structure and a cart for carrying the hunter's decoys. However, the cart in the '997 patent is not equipped to carry a large bag of decoys and cannot be converted into a bench seat configuration to support one or two hunters while hunting. Moreover, the frame of the cart in the '997 patent cannot be folded into a compact configuration for storage.

Another wheeled carrier for duck and goose decoys and the like is disclosed in U.S. Pat. No. 5,330,212 issued to Gardner. The carrier of the '212 patent is designed to carry individual decoys and the like, but is not particularly suitable for carrying a conventional decoy bag full of decoys. The frame of the carrier disclosed in the '212 patent is collapsible to allow the carrier to be camouflaged in the field. The carrier disclosed in the '212 patent cannot be converted into a seat for the hunter, and therefore, is more of a nuisance than a benefit to the hunter after reaching his hunting blind.

Thus, there is a need in the hunting and sporting equipment industries for an improved decoy carrier and seat assembly that can be converted from a transport configuration for carrying a bag full of decoys to a seat configuration for use by the hunter to sit on in his hunting blind.

SUMMARY OF THE INVENTION

It is an object of the present invention to provide an improved wheeled carrier and seat assembly for hunting that solves the problems with the conventional wheeled carriers described above.

More specifically, the principal objects of the present invention are to provide a wheeled carrier having an adjustable frame structure that can be converted between a transport configuration, a seating configuration, and a compact storage configuration; to provide a device for carrying a bag of decoys that can be easily and quickly converted into a bench seat or a reclined seat at a hunting location; to provide a comfortable seat assembly for hunters; to provide an adjustable frame structure with adjustable hinge assemblies that can be locked in selected angular positions; and to provide a wheeled carrier equipped with a plurality of fastening straps for securing a decoy bag and an accessory bag to the carrier and for stabilizing the carrier in its bench seat configuration.

It is a further object of the present invention to provide a combined wheeled vehicle and carrier assembly that is lightweight, economical to manufacture, efficient in use, capable of a long operating life, and particularly well suited for carrying hunting decoys and hunting accessories and for use as a seat while hunting.

In order to realize the objects and advantages set forth above, the Applicant has developed an improved carrier assembly for transporting a bag full of decoys that can be converted into a bench seat or a reclined seat for the hunter after reaching his hunting blind. The carrier has three planar frame structures connected to each other by hinge assemblies that can be locked in selected angular positions. The frame structures are adjustable relative to each other to a first angular position in which the carrier has a generally L-shaped transport configuration, a second angular position in which the carrier has a generally inverted U-shaped bench seat configuration, a third angular position in which the carrier has a reclined seat configuration, and a fourth angular position in which the carrier has a compact storage configuration. A pair of wheel assemblies are connected to one of the frame structures for supporting the carrier in its L-shaped transport configuration. A plurality of straps and mating couplers are connected to the frame structures and the decoy bag for attaching the decoy bag to the carrier. The straps and couplers are also used to stabilize the frame structures when the carrier is in its bench seat configuration.

The frame structures of the carrier are formed of tubular frames covered by a fabric material stretched over the frames. The fabric material provides support surfaces for the decoy bag when the carrier is in its L-shaped transport configuration, and a comfortable seating surface for the hunter when the carrier is in its seat configurations.

According to a broad aspect of the present invention, a combination wheeled carrier and seat assembly is provided, comprising: a first frame structure having a pair of laterally spaced sides and a supporting structure connected between the sides; a second frame structure having a pair of laterally spaced sides and being pivotally connected to a first end of the first frame structure by a first positioning means that allows selective positioning of the second frame structure between at least a folded storage position, an extended carrier position, and a seat-supporting position; a third frame structure having a pair of laterally spaced sides and being pivotally connected to a second end of the first frame structure opposite the first end thereof by a second positioning means; and a pair of wheel assemblies connected to the first frame structure adjacent to the second end thereof for supporting the frame structures for use as a wheeled carrier.

According to another broad aspect of the present invention, an improved wheeled carrier assembly is provided for transporting sporting equipment, comprising: a carrier having a plurality of generally planar frame structures connected to each other, the frame structures being adjustable relative to each other to a first angular position in which the carrier has a generally L-shaped transport configuration and a second angular position in which the carrier has a generally inverted U-shaped bench seat configuration; a pair of wheel assemblies connected to at least one of the frame structures for supporting the carrier in the L-shaped transport configuration; a first carrying bag adapted to be supported on the carrier; and a means for attaching the first carrying bag to at least one of the frame structures when the carrier is in the L-shaped transport configuration.

Numerous other objects and advantages of the present invention will be apparent to those skilled in this art from the following description wherein there is shown and described a preferred embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENTS

A wheeled carrier and seat assembly 15 for hunting according to a preferred embodiment of the present invention will now be described in detail by reference to FIGS. 1 to 12 of the accompanying drawings.

As shown in FIGS. 1 to 7, a combination wheeled carrier and seat assembly 15 is provided, which has a first frame structure 16, a second frame structure 17, and a third frame structure 18. The first frame structure 16 has a pair of laterally spaced tubular side members 19, 20 and a criss-crossed supporting structure 21 connected between the side members 19, 20. A fabric material 22, such as canvas with a camouflaged pattern printed thereon, is secured to the side members 19, 20 using suitable fasteners 23, such as snap fasteners, pop rivets, screws, and the like. The fabric material 22 is thereby stretched between the side members 19, 20 to form a planar support surface 24.

The second frame structure 17 has a tubular frame member 25 formed in a U-shape with laterally spaced sides 26, 27 and a connecting portion 28 extending between the sides 26, 27. The fabric material 22 is secured to the tubular frame member 25 using suitable fasteners 29, in the same manner that the fabric material 22 is secured to the side members 19, 20 of the first frame structure 16. The fabric material 22 is thereby stretched between the laterally spaced sides 26, 27 of the second frame structure 17 to form a planar support surface 20. An opening 31 is provided in the fabric material 22 to allow the user to grip the connecting portion 28 of the tubular frame member 25 for use as a handle for pushing and pulling the carrier assembly 15.

The second frame structure 17 is pivotally connected to a first end 32 of the first frame structure 16 by a first pair of locking hinge assemblies 33 secured to opposing ends 34, 35 of the tubular side members 19, 20 and the tubular frame member 25. The locking hinge assemblies 33 allow selective positioning of the second frame structure 17 relative to the first frame structure 16 to a plurality of selected angular positions. The structural details of the locking hinge assemblies 33 will be explained in detail below.

The third frame structure 18 has a tubular frame member 36 formed in a U-shape with laterally spaced sides 37, 38 and a connecting portion 39 extending between the sides 37, 38. The fabric material 22 is secured to the tubular frame member 36 using suitable fasteners, in the same manner that the fabric material 22 is secured to the first and second frame structures 16, 17. The fabric material 22 is thereby stretched between the laterally spaced sides 37, 38 of the third frame structure 18 to form a planar support surface 41.

The third frame structure 18 is pivotally connected to a second end 42 of the first frame structure 16 by a second pair of locking hinge assemblies 43 secured to opposing ends 44, 45 of the tubular side members 19, 20 and the tubular frame member 36. The locking hinge assemblies 43 allow selective positioning of the third frame structure 18 relative to the first frame structure 16 to a plurality of selected angular positions. The structural details of the locking hinge assemblies 43 will be explained in detail below.

In the preferred embodiment, the fasteners 23 for securing the fabric material 22 to the tubular frame members are snap fasteners that allow the fabric material 22 to be easily removed and replaced. Two or more interchangeable fabric materials 22 having different camouflage patterns are provided to allow the hunter to change the appearance of the carrier 15 to match the hunting terrain. For example, the fabric material 22 can be easily removed from the carrier 15 and replaced with a material having a different camouflage pattern when moving from a cattail-covered terrain to a forest and leaf-covered terrain.

A pair of wheel assemblies 46, 47 are connected to the first frame structure 16 adjacent to the second end 42 thereof for supporting the carrier 15 so that it can be pulled or pushed easily to a hunting location. The wheel assemblies 46, 47 are secured to respective ends of an axle 48, which provides added stability and durability in rough operating conditions. The wheel assemblies 46, 47 can be removed from the axle 48 for storage by simply removing pins from the ends of the axle 48 and sliding the wheels off of the axle. The axle 48 is secured to the first frame structure 16 by suitable supports 49 that extend in a generally V-shaped configuration from the side members 19, 20 of the first frame structure 16.

Figure 1:
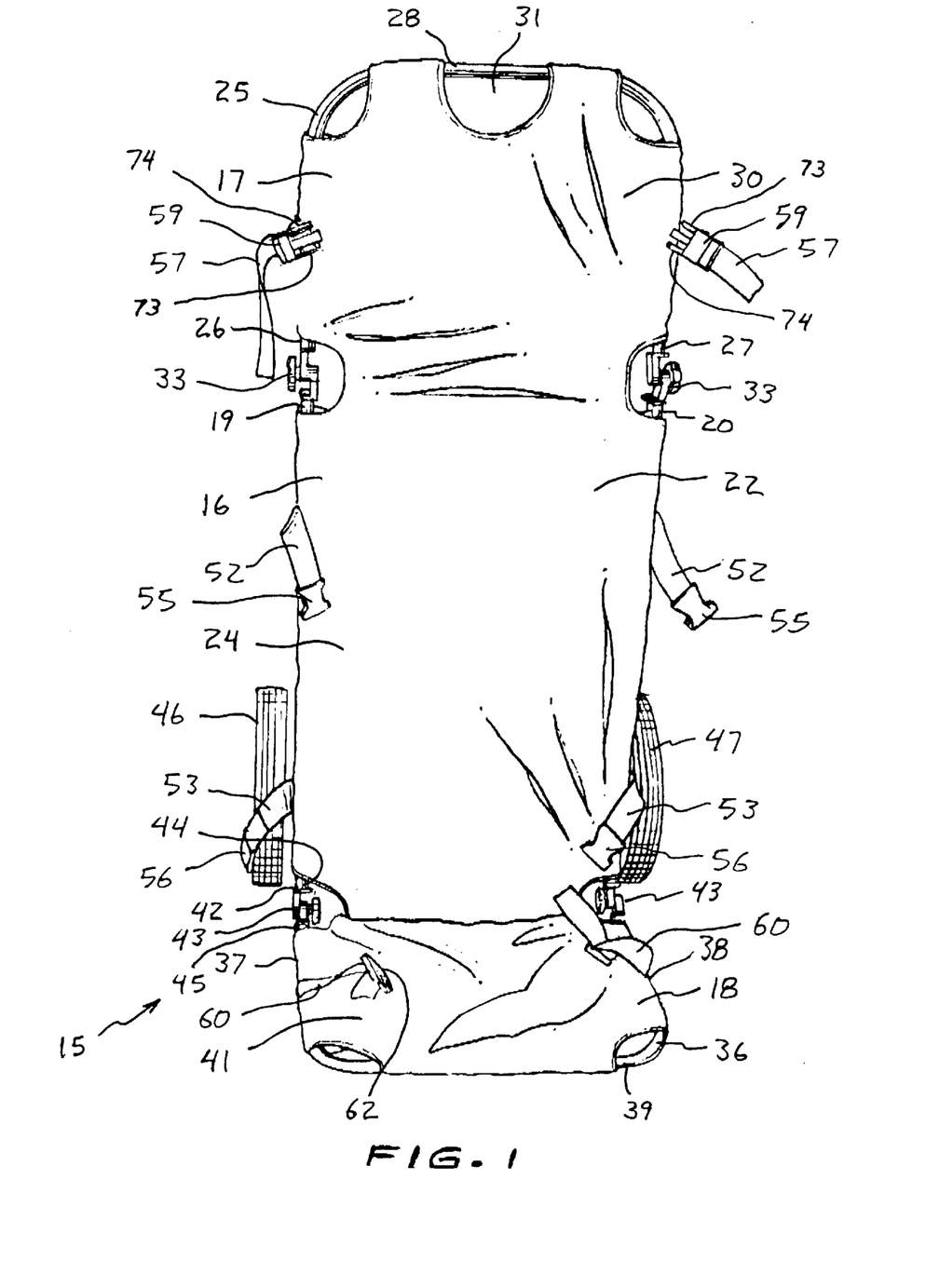
FIG. 1 is a perspective front view of a wheeled carrier and seat assembly according to the present invention.
Figure 2:
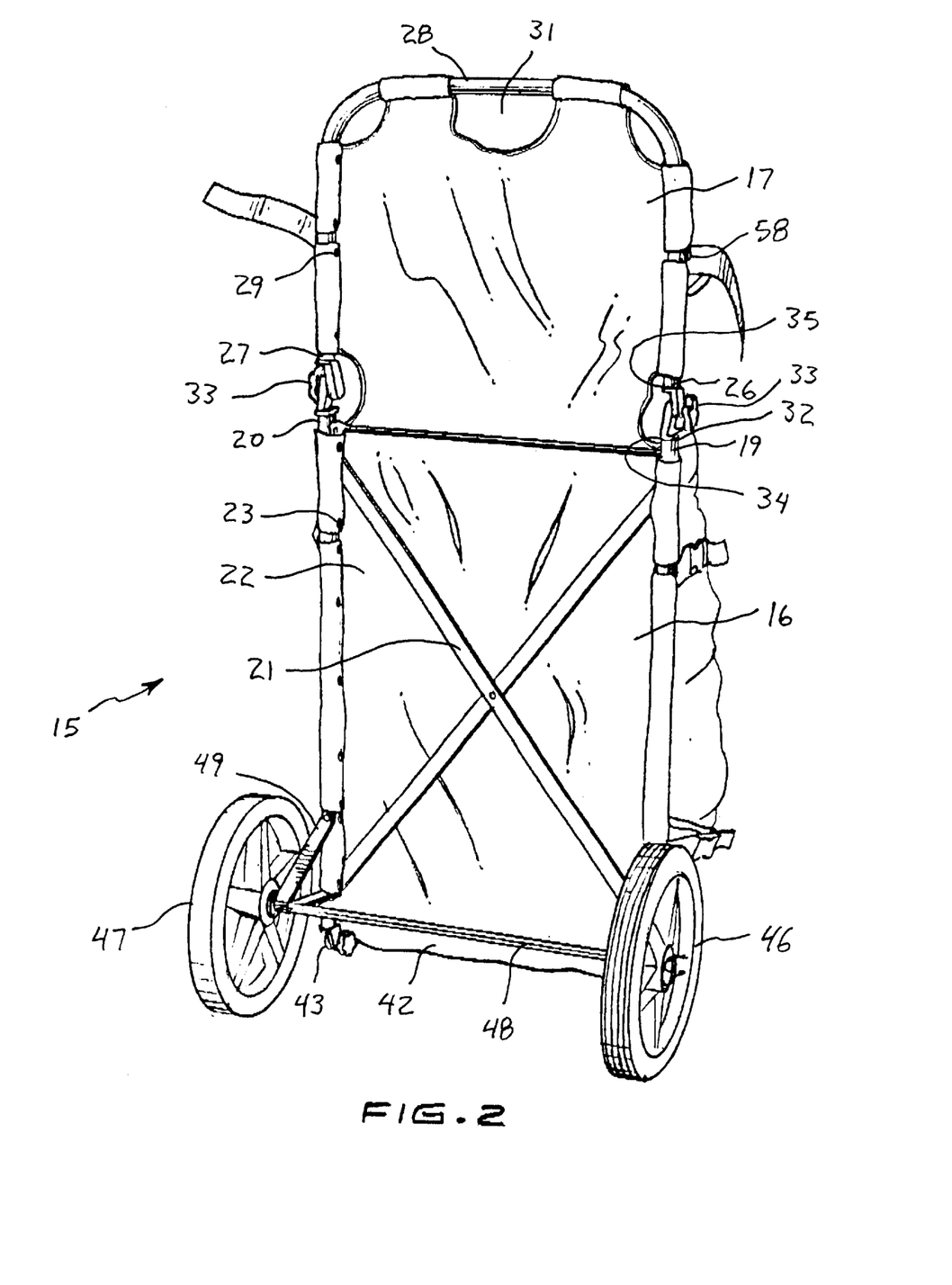
FIG. 2 is a perspective rear view of the wheeled carrier and seat assembly of the present invention.
Figure 3:
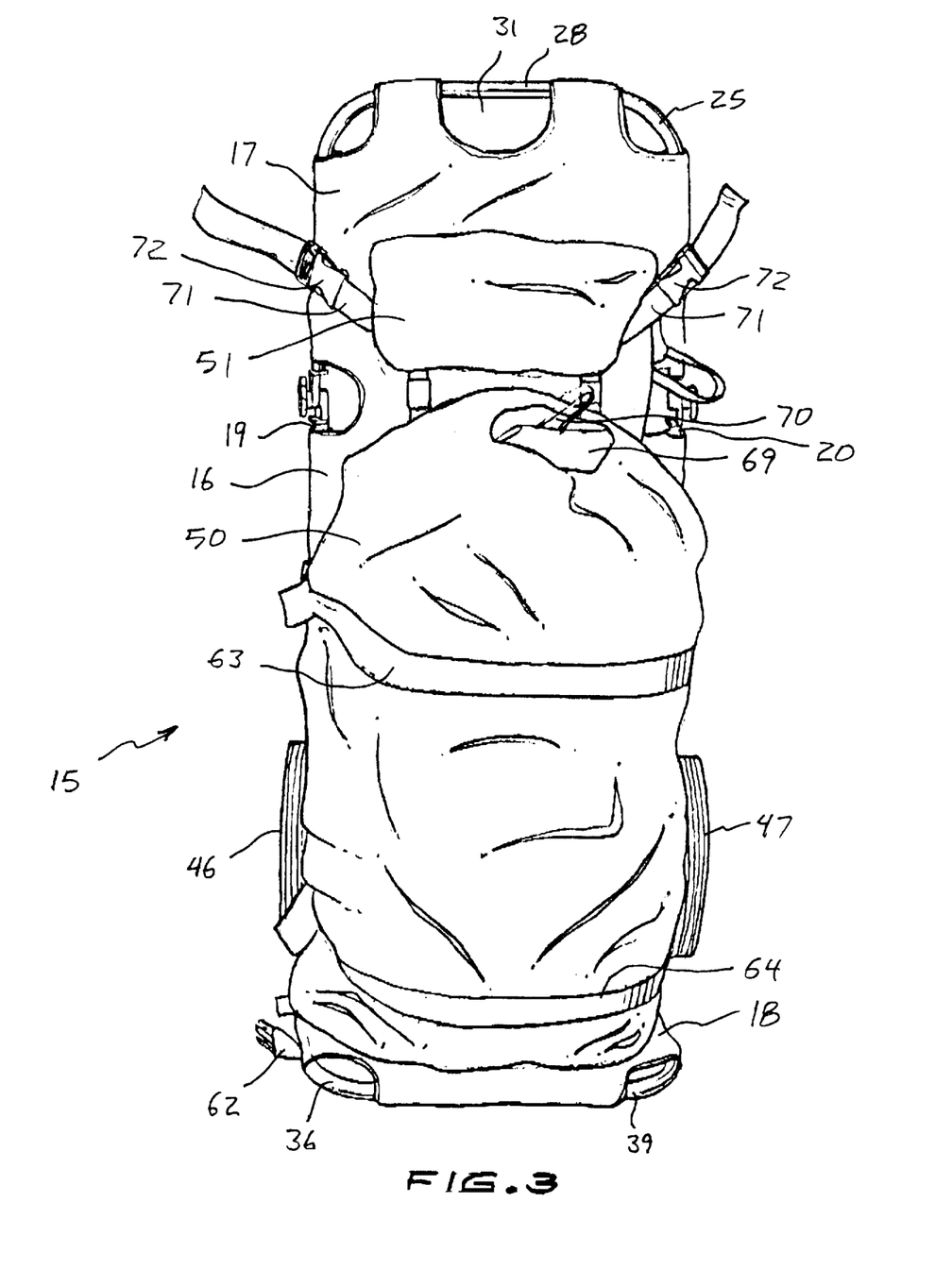
FIG. 3 is a perspective front view of the wheeled carrier and seat assembly of the present invention with a large decoy bag and a small accessory bag secured thereto.
Figure 4:
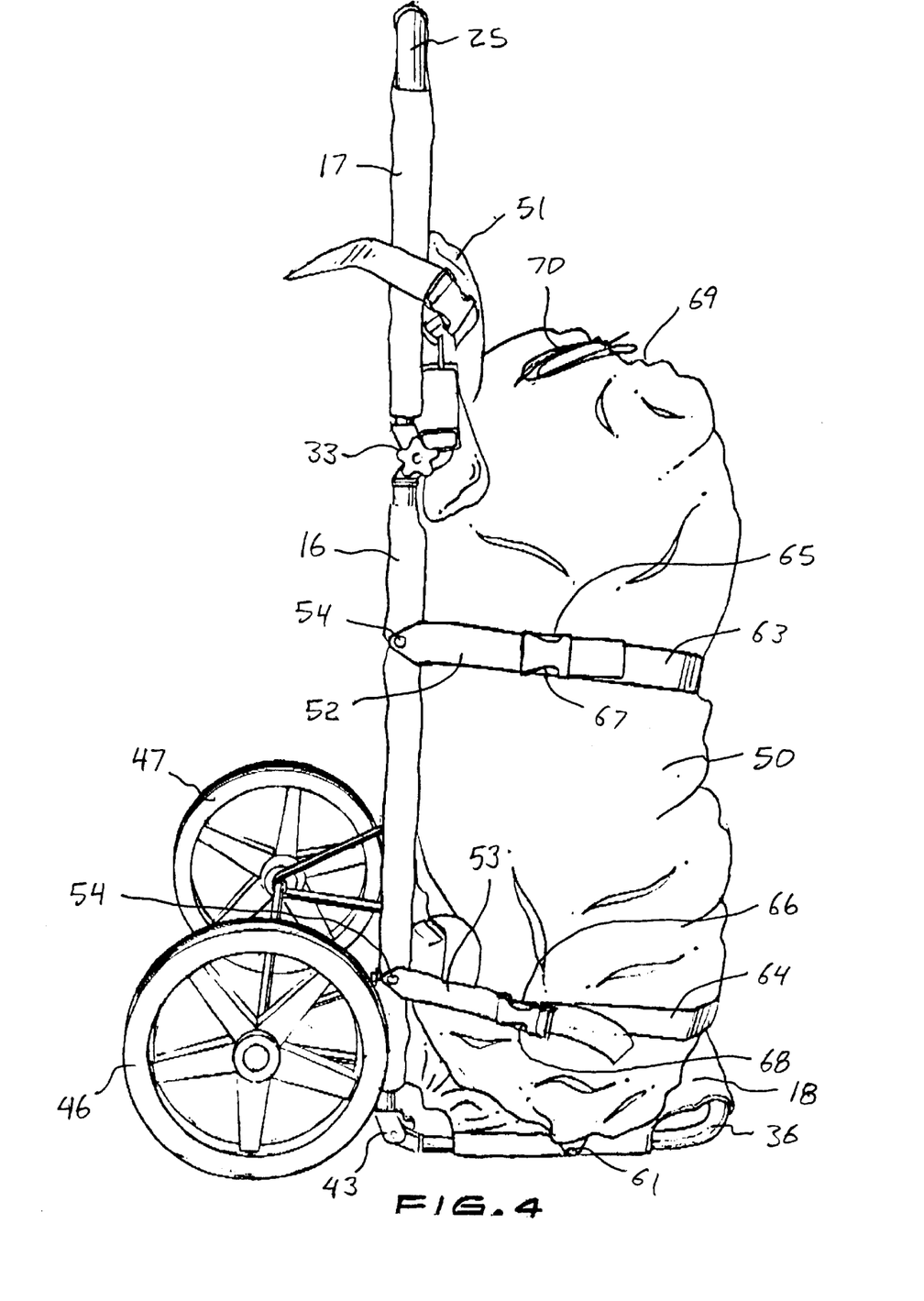
FIG. 4 is a perspective side view of the wheeled carrier and seat assembly of the present invention with the decoy bag and the accessory bag secured in place.
Figure 5:
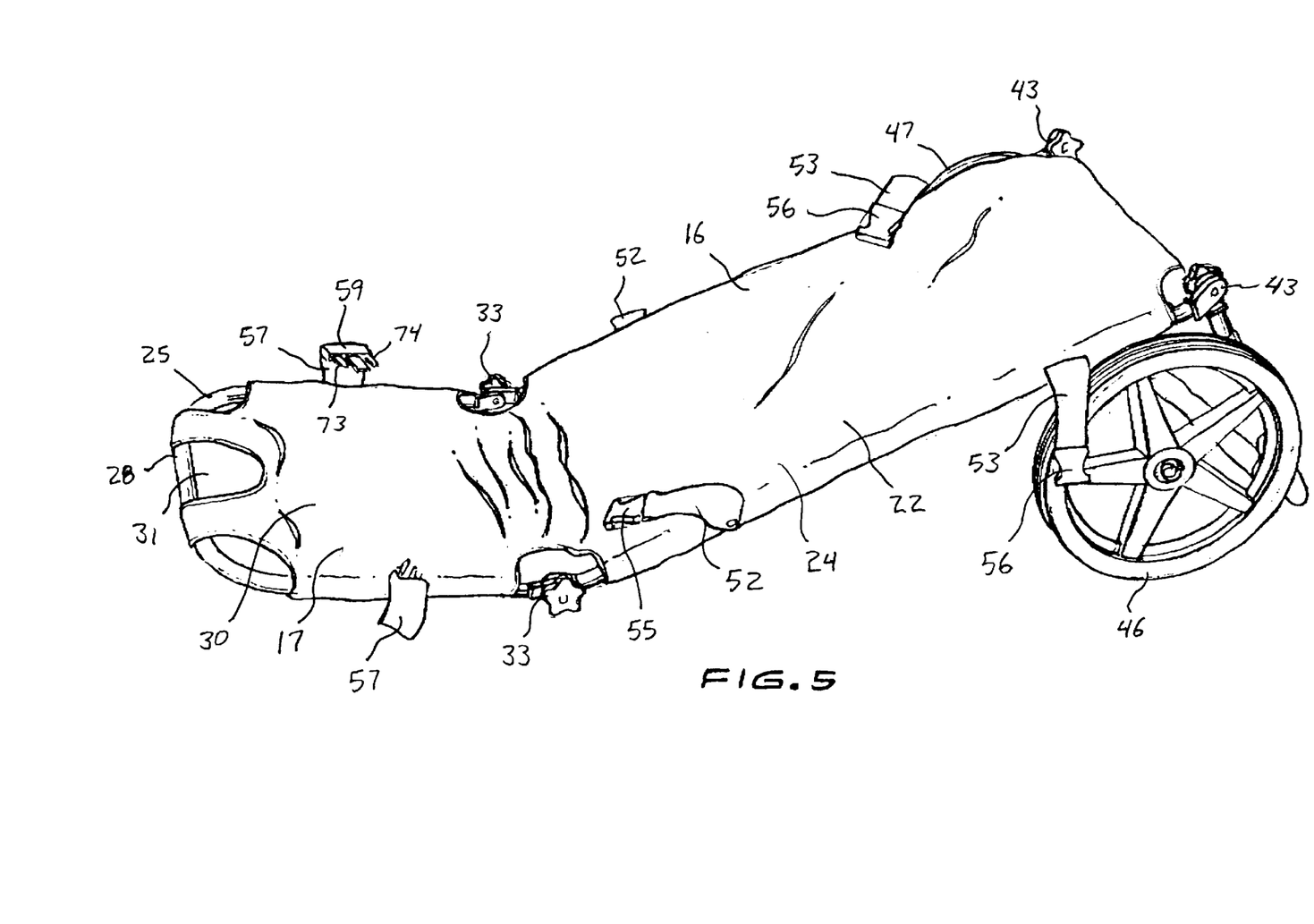
FIG. 5 is a perspective view of the wheeled carrier and seat assembly in a reclined seat configuration according to the present invention.
Figure 6:
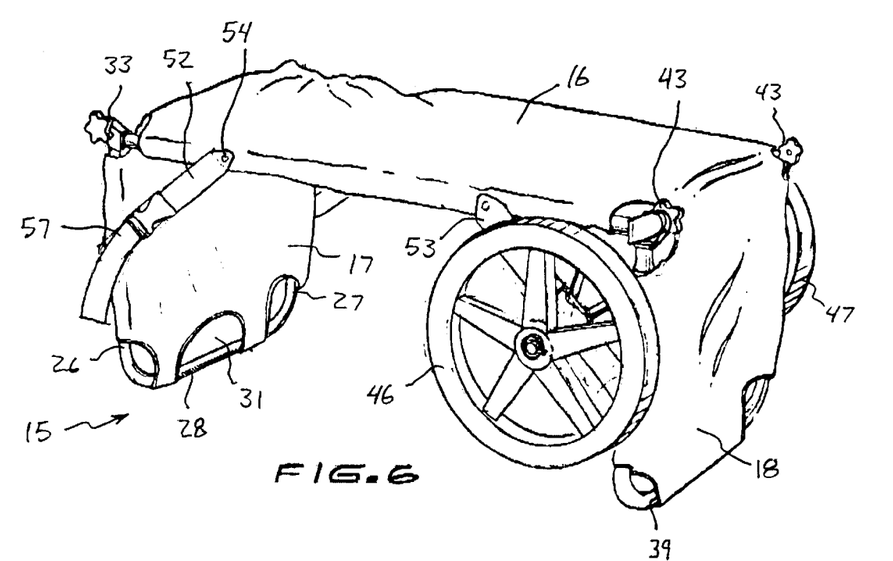
FIG. 6 is a perspective view of the wheeled carrier and seat assembly in a bench seat configuration according to the present invention.
Figure 7:
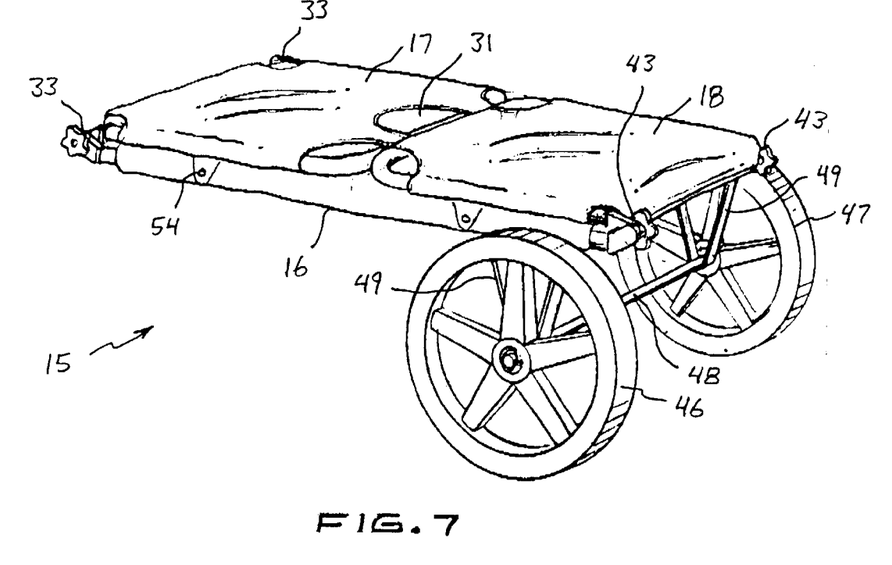
FIG. 7 is a perspective view of the wheeled carrier and seat assembly in a folded storage configuration according to the present invention.
Figures 8, 9, 11, 12:
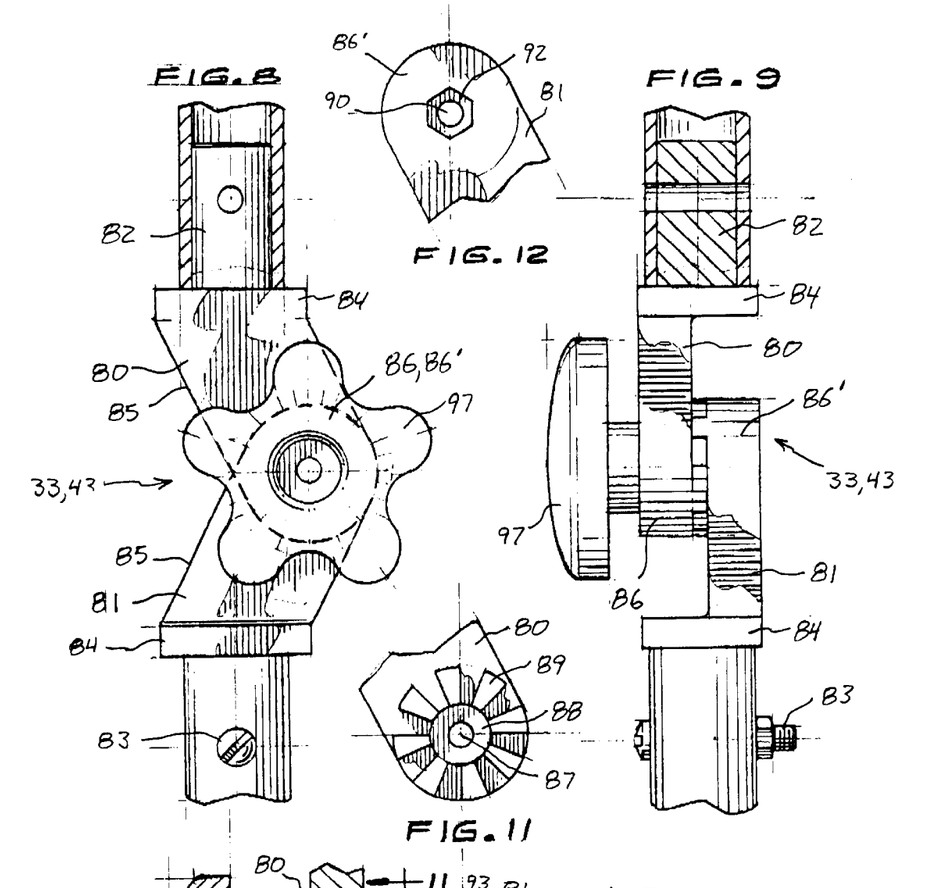
FIG. 8 is a side view in partial section of an adjustable hinge assembly used with the carrier of the present invention.
FIG. 9 is a front view in partial section of the adjustable hinge assembly shown in FIG. 8.
FIG. 11 is a side view of the hinge assembly of the present invention, as viewed along line 11—11 in FIG. 10.
FIG. 12 is a side view of the hinge assembly of the present invention, as viewed along line 12—12 in FIG. 10.
Figure 10:
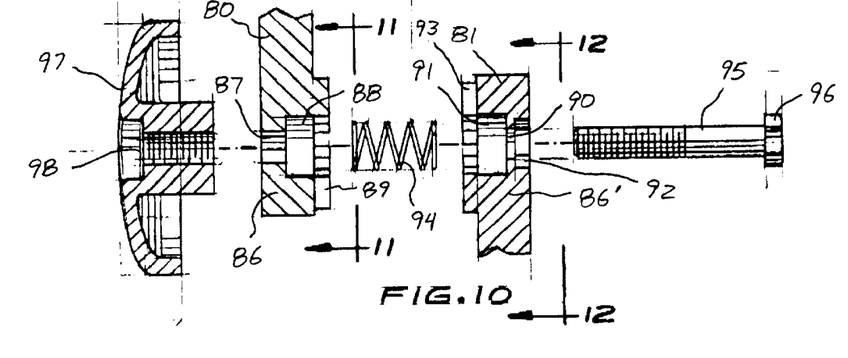
FIG. 10 is an exploded sectional view of the adjustable hinge assembly shown in FIG. 9.

As explained above, the first, second and third frame structures 16, 17, 18 are pivotally connected to each other to allow selective positioning of the frame structures 16, 17, 18 relative to each other. For example, the frame structures 16, 17, 18 can be positioned in: a generally L-shaped transport configuration, as shown in FIGS. 1 to 4; a reclined seat configuration, as shown in FIG. 5; an inverted U-shaped bench seat configuration, as shown in FIG. 6; and a folded storage configuration, as shown in FIG. 7. The locking hinge assemblies 33, 34 are such that the frame structures 16, 17, 18 can be moved to a selected angular position and then locked in place at the selected position.

In the L-shaped transport configuration shown in FIGS. 1 to 4, the first and second frame structures 16, 17 are positioned end-to-end in generally the same plane to form one side of the L-shape, and the third frame structure 18 extends at approximately a 90-degree angle to the first frame structure 16 to form the other side of the L-shape. Thus, the frame structures 16, 17, 18 form a transport carrier 15 having a configuration similar to a conventional hand truck or wheeled dolly.

In the reclined seat configuration shown in FIG. 5, the second frame structure 17 is positioned at an angle of approximately 120 to 160 degrees relative to the first frame structure 16 such that both the second frame structure 17 and the first end 32 of the first frame structure 16 rests on the ground surface. The second end 42 of the first frame structure 16 is supported above the ground surface by the wheel assemblies 46, 47. The third frame structure 18 is pivoted to an angular position relative to the first frame structure 16 which is approximately 180 degrees from its position in the L-shaped transport configuration. The third frame structure 18 is thus moved to a lowered position to help camouflage the carrier 15 in the reclined seat configuration. In this reclined seat configuration, the hunter can sit on the planar surface 30 of the second frame structure 17 and then recline backwardly to rest on the inclined planar surface 24 of the first frame structure 16. This reclined position is particularly suitable for goose hunting and open fields, for example, where a hunting blind is not used.

In the inverted U-shaped seat configuration shown in FIG. 6, the second and third frame structures 17, 18 are moved to positions in which they extend at approximately 90 degree angles relative to the first frame structure 16. The first frame structure 16 is thus supported in this configuration to form a bench seat on which the hunter can sit during hunting, for example, in a duck blind. The bench seat in the preferred embodiment is large enough that two hunters can sit comfortably on the seat. This is particularly useful, for example, where the ducks or other game being hunted might fly toward the hunter's blind from more than one direction, and two hunters can position themselves back-to-back on the bench seat to monitor incoming ducks or other game from all directions.

In the folded storage configuration shown in FIG. 7, the second and third frame structures 17, 18 are moved to folded storage positions against the first frame structure 16. The second and third frame structures 17, 18 are generally parallel to and folded against the first frame structure 16 in this configuration. To move the second frame structure 17 to its folded storage position, it is pivoted relative to the first frame structure 16 about the respective locking hinge assemblies 33 approximately 180 degrees from its L-shaped transport position shown in FIGS. 1 to 4. To move the third frame structure 18 to its folded storage position, it is pivoted relative to the first frame structure 16 about the respective locking hinge assemblies 33 approximately 90 degrees from its L-shaped transport position shown in FIGS. 1 to 4. The total range of movement of the second and third frame structures 17, 18 relative to the first frame structure 16 is approximately 270 degrees. This range of movement is illustrated by comparing the angular positions of the second and third frame structures 17, 18 in FIGS. 6 and 7.

A plurality of fastening straps are provided to secure carrying bags 50, 51 to the carrier 15 and to stabilize the frame structures 16, 17, 18 when they are positioned in the bench seat configuration. First and second pairs of fastening straps 52, 53 are secured at spaced locations on the first frame structure 16 using suitable fasteners 54, such as screws, rivets, and the like. The first pair of fastening straps 52 are positioned at a distance from the first end 32 of the first frame structure 16 of approximately one-fourth of the overall length of the first frame structure 16. Similarly, the second pair of fastening straps 53 are positioned at a distance from the second end 42 of the first frame structure 16 of approximately one-fourth of the overall length of the first frame structure 16. The first and second pairs of fastening straps 52, 53 have female end couplers 55, 56 secured to their respective ends.

A third pair of fastening straps 57 are secured to respective sides 26, 27 of the second frame structure 17 using suitable fasteners 58, such as screws, rivets, and the like. The third pair of fastening straps 57 are positioned approximately at a mid point of the length of the second frame structure 17. The third pair of fastening straps 57 have male end couplers 59 secured to their respective ends.

A fourth pair of fastening straps 60 are secured to respective sides 37, 38 of the third frame structure 18 using suitable fasteners 61, such as screws, rivets, and the like. The fourth pair of fastening straps 60 are positioned approximately at a mid point of the length of the third frame structure 18. The fourth pair of fastening straps 60 have male end couplers 62 secured to their respective ends.

A large bag 50 for carrying decoys and the like is provided for being transported on the carrier 15. The decoy bag 50 has a plurality of straps 63, 64 fastened thereto, for example, by stitching, gluing, or the like. The straps 63, 64 preferably extend around the decoy bag 50 in the manner shown in FIG. 3 to surround the front side of the decoy bag 50. The straps 63, 64 each have male end couplers 65, 66 secured to their respective ends for mating with the female end couplers 55, 56 of the first and second pairs of fastening straps 52, 53 on the first frame structure 16. When the male end couplers 65, 66 of the straps 63, 64 on the decoy bag 50 are mated with the female end couplers 55, 56 of the first and second pairs of fastening straps 52, 53, the decoy bag 50 is held securely to the carrier 15 and can be transported over rough terrain and for great distances to remote hunting locations by the hunter. The male end couplers 65, 66 are provided with conventional flexible engaging portions 67, 68 that can be disengaged from the female end couplers 55, 56 by merely squeezing the coupler assembly. Thus, the decoy bag 50 can be secured to and removed from the carrier 15 easily. The decoy bag 50 has an open end 69 that can be selectively opened and closed using a conventional drawstring 70 or the like.

By securing the decoy bag 50 to the carrier 15, the decoys within the bag 50 will provide buoyancy to keep the carrier 15 afloat, for example, when the carrier 15 is transported across a body of water. The carrier 15 has a buoyant cushion material provided between layers of the fabric material 22 on the first frame structure 16 to provide buoyancy for the carrier 15 and added comfort for the hunter seated on the seat configurations shown in FIGS. 5 and 6.

A small bag 51 for carrying hunting accessories, food, and so forth, can also be secured to and transported on the carrier 15. The accessory bag 51 has a pair of straps 71 fastened thereto, for example, by stitching, gluing, or the like. The straps 71 each have female end couplers 72 secured to their respective ends for mating with the respective male end couplers 59 of the third pair of fastening straps 57 on the second frame structure 17. When the female end couplers 72 of the straps 71 on the accessory bag 51 are mated with the male end couplers 59 of the first and second pairs of fastening straps 52, 53, the accessory bag 51 is held securely to the carrier 15 and can be transported along with the decoy bag 50 to remote hunting locations by the hunter. The male end couplers 59 are provided with conventional flexible engaging members 73, 74 that can be disengaged by merely squeezing the coupler assembly. Thus, the accessory bag 51 can be secured to and removed from the carrier 15 easily.

The first and second pairs of fastening straps 52, 53 and the third and fourth pairs of fastening straps 57, 60 can be connected to each other in the manner shown in FIG. 6 to provide stabilizing braces between the first and second frame structures 16, 17 and between the first and third frame structures 16, 18. The stabilizing braces function to relieve a portion of the stress on the locking hinge assemblies 33, 43 to increase the strength and durability of the bench seat configuration.

The structural details of the locking hinge assemblies 33, 43 will now be described in detail with reference to FIGS. 8 to 12 of the drawings.

The locking hinge assemblies 33, 43 each have a first hinge member 80 connected to one of the tubular frame members, and a second hinge member 81 connected to another one of the tubular frame members. The first and second hinge members 80, 81 each have a cylindrical-shaped connecting portion 82 received within the respective tubular frame members. A suitable fastener 83, such as a machine bolt, a threaded screw or a roll pin, is used to secure the connecting portions 82 within the tubular frame members. A flange portion 84 is provided at the proximal end of the cylindrical-shaped connecting portion 82 and functions as a stop to prevent over insertion into the tubular frame members during assembly. An angled portion 85 extends from the flange portion 84 and has a circular interlocking structure 86, 86' at its free end.

The circular interlocking structure 86 on the first hinge member 80 has a central opening 87, a circular recess 88 surrounding the central opening 87, and a plurality of projections 89 disposed about the circular recess 88. The projections 89 are spaced uniformly about the circular recess 88 and extend radially therefrom. The circular interlocking structure 86' on the second hinge member 81 has a central opening 90, a circular recess 91 surrounding the central opening 90, a hexagonal-shaped recess 92 surrounding the central opening 90 on an opposite side of the hinge member 81 from the circular recess 91, and a plurality of projections 93 disposed about the circular recess 91. The projections 93 are spaced uniformly about the circular recess 91 and are arranged to interlock with the projections 89 on the first hinge member 80 at selected angular positions. For example, the illustrated embodiment has eight projections 89, 93 on each hinge member 80, 81 that allow adjustment to selected angular positions spaced every 45 degrees.

When the circular interlocking structures 86, 86' are aligned and interlocked with each other, the circular recesses 88, 91 are also aligned with each other. A compression spring 94 is placed within the circular recesses 88, 91 to bias the interlocking structures 86, 86' apart. A threaded bolt 95 extends through the central openings 87, 90 in the interlocking structures 86, 86' and has its hexagonal-shaped head 96 received in the hexagonal-shaped recess 92. A hand knob 97 having a central opening 98 with female threads is secured to the threaded end of the bolt 95. The hand knob 97 can be operated easily by the hunter to tighten and loosen the interlocking structures 86, 86'. When the hand knob 97 is loosened sufficiently, the projections 89, 93 of the interlocking structures 86, 86' are disengaged from one another and allow the hinge assemblies 33, 43 to be pivoted to other angular positions. When the hand knob 97 is tightened, the projections 89, 93 of the interlocking structures 86, 86' are engaged together and function to lock the hinge assemblies 33, 43 securely in a selected angular position.

Although the preferred embodiment described above and shown in the drawings has a fabric material 22 stretched between the tubular frame members 19, 20, 25, 36, the frame structures 16, 17, 18 can also be made of other materials that provide a lightweight and high strength frame, such as molded plastic or expanded metal mesh. Also, other types of couplers can be used to secure the various fastening straps together, such as hook and pile fasteners commonly referred to as VELCRO™.

It will be appreciated that the present invention is not limited to the exact constructions that have been described above and illustrated in the accompanying drawings, and that various modifications and changes can be made without departing from the scope and spirit of the invention. It is intended that the scope of the invention be limited only by the appended claims.

What is claimed is:

1. A combination wheeled carrier and seat assembly, comprising:
   a first frame structure having a pair of laterally spaced sides and a supporting structure connected between the sides;
   a second frame structure having a pair of laterally spaced sides and being pivotally connected to a first end of the first frame structure by a first locking hinge assembly that allows selective positioning of the second frame structure between at least a folded storage position, an extended carrier position, and a seat-supporting position;
   a third frame structure having a pair of laterally spaced sides and being pivotally connected to a second end of the first frame structure opposite the first end thereof by a second locking hinge assembly that allows selective positioning of the third frame structure relative to the first frame structure between at least a folded storage position, an L-shaped carrier position, and a seat-supporting position; and
   a pair of wheel assemblies connected to the first frame structure adjacent to the second end thereof and arranged to support the frame structures for use as a wheeled carrier when the third frame structure is in its L-shaped carrier position;
   wherein the L-shaped carrier position and the seat-supporting position of the third frame structure are angularly spaced approximately 180 degrees apart from each other, the extended carrier position and the seat-supporting position of the second frame structure are angularly spaced approximately 90 degrees apart from each other, and the extended carrier position and the folded storage position of the second frame structure are angularly spaced approximately 180 degrees apart from each other; and wherein the first, second and third frame structures form a generally inverted U-shape When the second and third frame structures are arranged in their respective seat-supporting positions relative to the first frame structures the first frame structure thereby providing a bench seat supported above a surface by the second and third frame structures.

2. The combination wheeled carrier and seat assembly according to claim 1, wherein the folded storage position and the L-shaped carrier position of the third frame structure are angularly spaced approximately 90 degrees apart from each other.

3. The combination wheeled carrier and seat assembly according to claim 1, further comprising at least one pair of fastening straps connected to at least one of the frame structures for securing a fabric bag to the carrier.

4. The combination wheeled carrier and seat assembly according to claim 1, further comprising first and second pairs of fastening straps connected to the first frame structure for securing a first carrying bag to the carrier, and a third pair of fastening straps connected to the second frame structure for securing a second carrying bag to the carrier.

5. The combination wheeled carrier and seat assembly according to claim 4, further comprising a fourth pair of fastening straps connected to the third frame structure, the fourth pair of fastening straps being connectible to the second pair of fastening straps when the third frame structure is in its seat-supporting position, and the third pair of fastening straps being connectible to the first pair of fastening straps when the second frame structure is in its seat-supporting position, the straps being arranged to stabilize the frame structures relative to each other in the seat-supporting positions.

6. The combination wheeled carrier and seat assembly according to claim 1, wherein the first and second locking hinge assemblies are operable to secure the second and third frame structures in a plurality of selected angular positions relative to the first frame structure.

7. The combination wheeled carrier and seat assembly according to claim 6, wherein the first and second locking hinge assemblies each comprises a pair of opposing surfaces with interlocking projections and a threaded clamp structure for selectively moving the interlocking projections into and out of interlocking engagement with each other.

8. The combination wheeled carrier and seat assembly according to claim 6, wherein the first, second and third frame structures are adjustable to a reclining position wherein the second frame structure is generally parallel to and rests on a support surface, the first frame structure extends at an inclined angle relative to the support surface, and the second end of the first frame structure is supported above the support surface by the wheel assemblies.

9. The combination wheeled carrier and seat assembly according to claim 1, wherein the first, second and third frame structures each comprises a tubular framework and a cloth covering stretched over the tubular framework to from a generally planar structure.

10. A wheeled carrier assembly for transporting sporting equipment, comprising:

a carrier having first, second and third generally planar frame structures, the first frame structure having a first end connected to said second frame structure and a second end connected to said third frame structure, the frame structures being adjustable relative to each other between a first angular position in which the carrier has a generally L-shaped transport configuration with the first and second frame structures being generally coplanar and the third frame structure extending generally perpendicular to the first frame structure, a second angular position in which the carrier has a generally inverted U-shaped bench seat configuration with the first and third frame structures extending generally perpendicular to the first frame structure, and a third angular position iii which the carrier has a folded storage configuration with the second and third frame structures being folded generally flat against the first frame structure and the second frame structure being angularly displaced relative to said first frame structure approximately 180 degrees from said first angular position; and a pair of wheel assemblies connected to at least one of the frame structures for supporting the carrier in the transport configuration.

11. The wheeled carrier assembly according to claim 10, further comprising a first carrying bag adapted to be supported on the carrier, and a means for attaching the first carrying bag to at least one of the frame structures when the carrier is in the transport configuration.

12. The wheeled carrier assembly according to claim 11, wherein the attaching means comprises a first plurality of straps secured to one of the frame structures, a second plurality of straps secured to the first carrying bag, and a plurality of mating couplers secured to the first plurality of straps and the second plurality of straps, respectively.

13. The wheeled carrier assembly according to claim 12, wherein the mating couplers secured to the straps on the carrying bag are male couplers and the mating couplers secured to the first plurality of straps on the frame structure are female couplers adapted to receive the male couplers.

14. The wheeled carrier assembly according to claim 12, wherein the mating, couplers comprise quick-release buckles that are held securely together upon mating and are releasible by squeezing opposite sides of the couplers.

15. The wheeled carrier assembly according to claim 11, further comprising a second carrying bag having a plurality of straps secured thereto, and another plurality of straps secured to one of the frame structures, the straps having mating couplers secured thereto for attaching the second carrying bag to the carrier.

16. The wheeled carrier assembly according to claim 10, wherein the plurality of frame structures each comprises a tubular frame covered by a fabric material, the fabric material providing a comfortable seating surface when the carrier is in the bench seat configuration, and the fabric material being removable from the tubular frame and interchangeable with a second fabric material having a different appearance.

17. The wheeled carrier assembly according to claim 10, wherein the wheel assemblies are easily removable from said at least one frame structure to provide a compact storage configuration.

* * * * *